April 18, 1944.     J. TOD     2,347,007
APPARATUS FOR HANDLING BAKED BUNS OR THE LIKE
Filed Dec. 10, 1941     3 Sheets-Sheet 1

April 18, 1944.  J. TOD  2,347,007
APPARATUS FOR HANDLING BAKED BUNS OR THE LIKE
Filed Dec. 10, 1941  3 Sheets-Sheet 2

April 18, 1944.   J. TOD   2,347,007
APPARATUS FOR HANDLING BAKED BUNS OR THE LIKE
Filed Dec. 10, 1941   3 Sheets-Sheet 3

Inventor:
John Tod
By A. Trevor Jones
Atty.

Patented Apr. 18, 1944

2,347,007

UNITED STATES PATENT OFFICE 2,347,007

APPARATUS FOR HANDLING BAKED BUNS OR THE LIKE

John Tod, Des Moines, Iowa, assignor to Interstate Bakeries Corporation, Kansas City, Mo., a corporation of Delaware Application December 10, 1941, Serial No. 422,418

8 Claims. (Cl. 146—73)

This invention relates to apparatus for handling baked buns or the like for use particularly in large bakeries supplying the products to retailers.

The invention aims to provide, among other objects, means whereby the baker products may be handled continuously from the oven to the wrapping machine, while being desirably sliced during the course of such continuous handling, so that the buns or the like are fresher and softer when finally wrapped and ready for delivery to the customer.

In one aspect, the invention contemplates for this purpose, unitary apparatus which may be readily rolled into position for use in the continuous operation referred to, and which when not in use may be moved out of the way and may have folding parts to conserve space.

Furthermore, the apparatus may be readily adapted for the handling of unsliced bakery products, with marked advantageous continuity of operation and consequent fresher and softer products.

Other objects and advantages will be apparent from the following description, taken together with the accompanying drawings, in which—

Figure 5 is a fragmentary plan section, with parts omitted, taken on the line 5—5 of Fig. 1, and somewhat enlarged.

Figure 2:
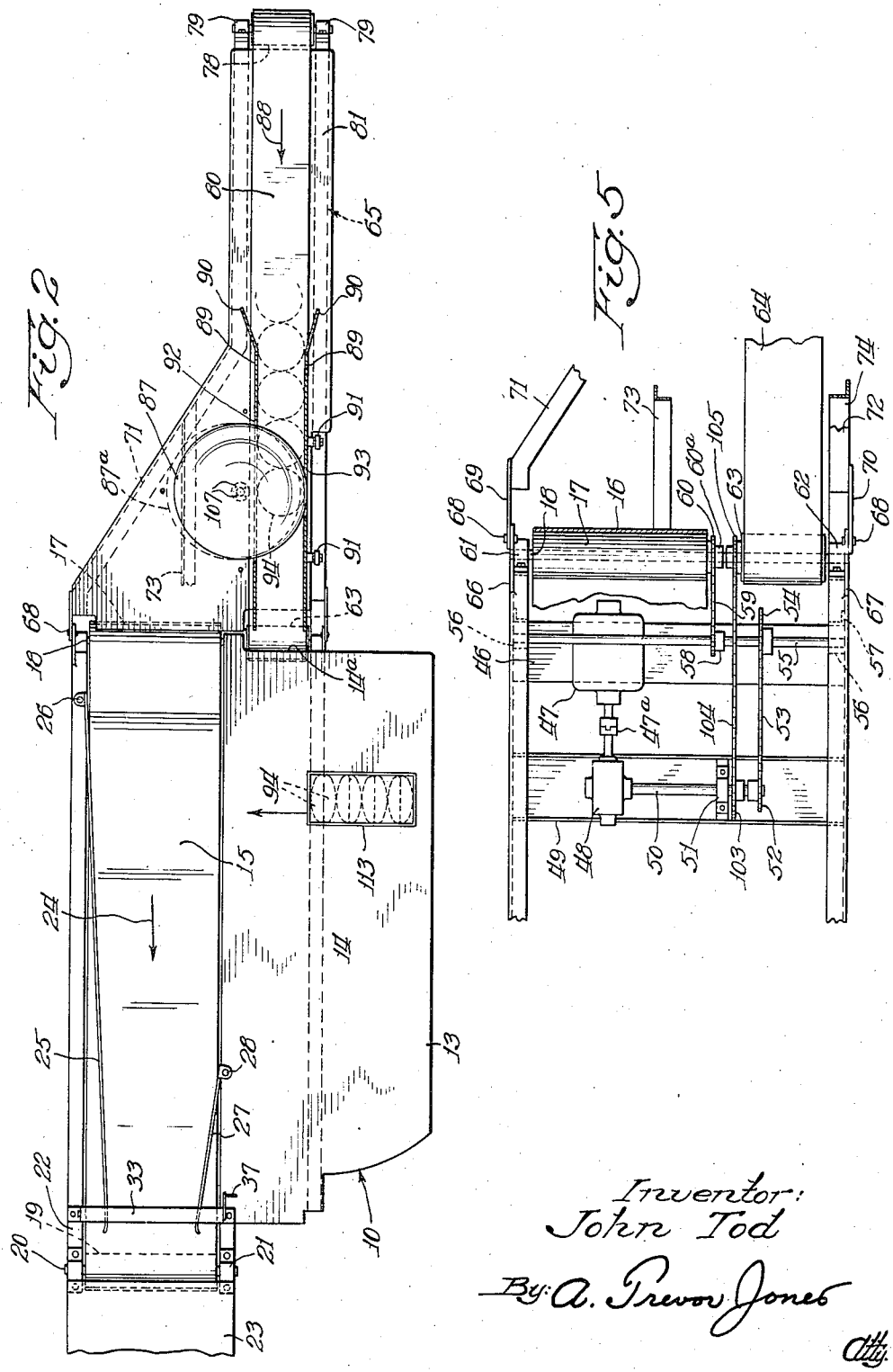
Figure 2 is a plan view of the structure of Fig. 1 with parts omitted for clearness of description, and being partially in section.
Figure 3:
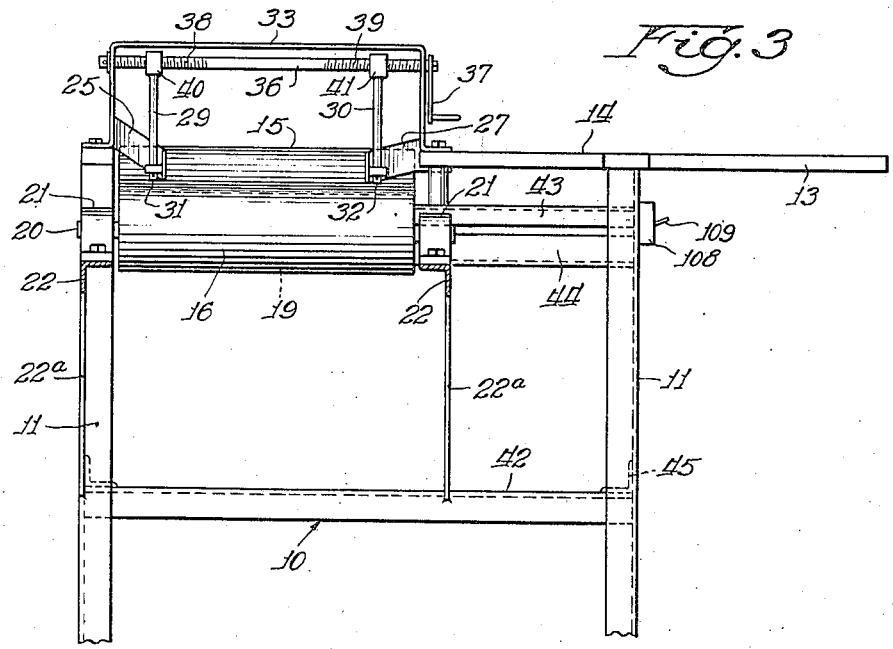
Figure 3 is an end enlarged elevational view taken from the left-hand side of Fig. 1, partially in section.

Referring in detail to the illustrative construction shown in the drawings, the table 10 may be of the usual built-up angle iron construction, having the usual four legs 11, provided at their lower ends with casters 12. The top of the table is sectional, one section comprising a wooded board 13 suitably secured to the table top along one side thereof and overhanging that side, as best shown in Figs. 2 and 3, and providing a working surface 14. The other section of the table top is here shown as the upper run 15 of an endless belt conveyor 16. At one end of the table, a roller 17 is provided for the belt conveyor 16, this roller being axled as at 18 on the table. At the other end of the table another roller 19 is provided and axled as at 20 in bearings 21 supported by the projecting table channels 22 at this end of the table, these channels also carrying a plate 23 forming a platform continuation of the upper run 15 of the conveyor, and which may lead to a suitable wrapping machine, not a part of the present invention but with which the present apparatus may be advantageously associated. Diagonal braces 22a may assist in supporting the mounting for the discharge roller 19 and plate 23 in somewhat cantilever fashion.

Figure 1:
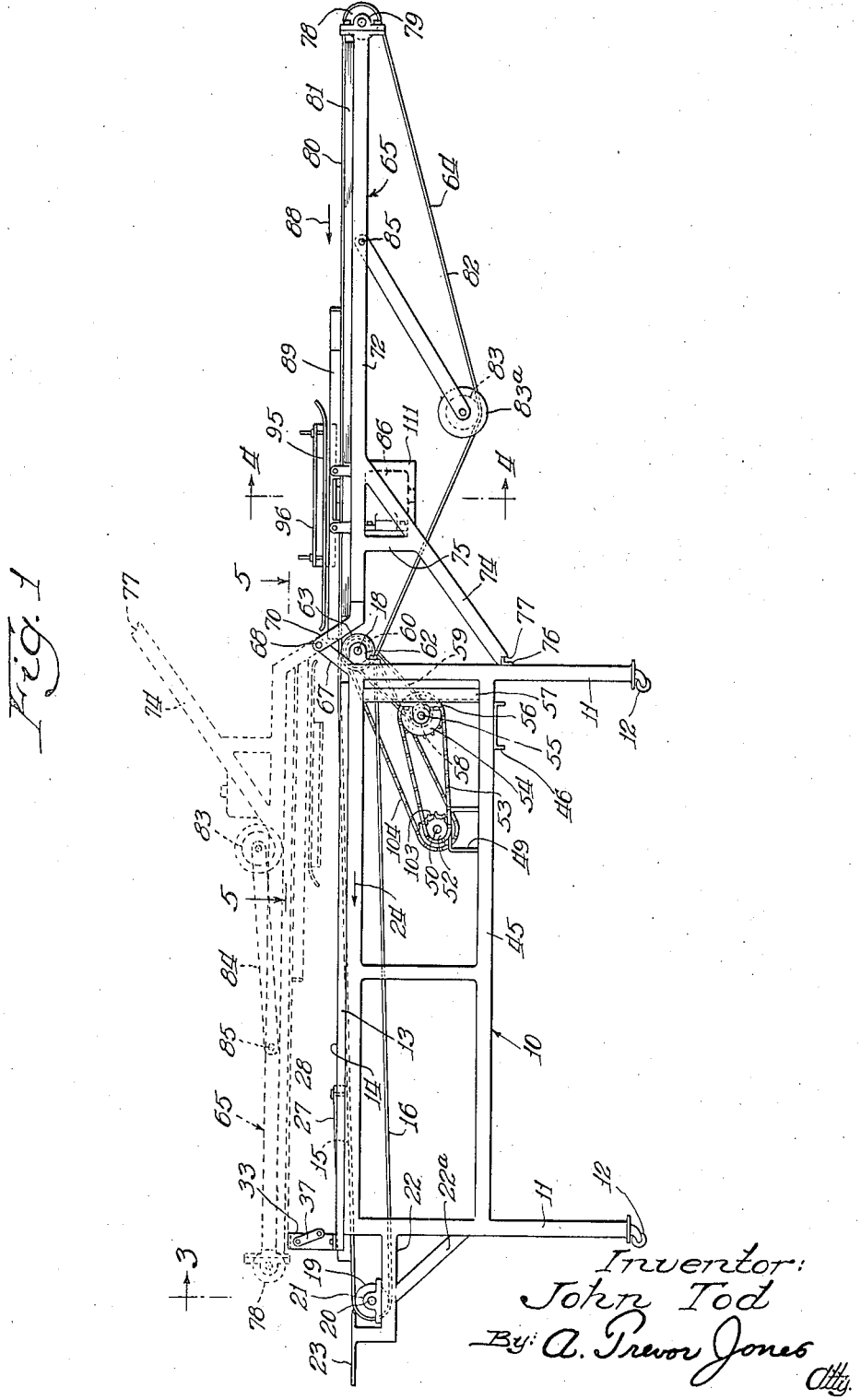
Figure 1 is a side elevational view of one form of apparatus embodying the present invention, with parts removed for clearness of description, the full lines showing the apparatus in operative position and the dotted lines indicating folding of the parts when not in use.

As will be best seen from Fig. 1, the roller 17 is elevated slightly above the roller 19 so that the upper run of the conveyor belt, which moves in the direction of the arrow 24, is inclined downwardly toward the delivery end of the apparatus, and along one side of the conveyor is provided a deflector bar 25 which extends almost the entire length of the conveyor and is pivoted as at 26 to one end of the table. At the other side of the conveyor, adjacent the working surface 14, a shorter deflector bar 27 is pivoted as at 28 and terminates with the deflector bar 25 adjacent the discharge end. At this end the deflector bars 25 and 27, which it will be seen also desirably slope downwardly to conform to the slope of the conveyor, are supported by hanger rods 29 and 30 respectively which are rotatable with respect to the deflector bars as at 31 and 32 and are reciprocable toward and from each other. For this purpose, the rods 29 and 30 hang from an arched strap member 33, secured across the conveyor, and this strap member has journaled therein a threaded shaft 36 provided with a handled crank 37 at its end adjacent the working surface 14. The threads 38 and 39 respectively at opposite ends of this shaft are left-hand and right-hand threaded respectively and pass through a threaded boss as 40 and 41 at the upper ends of the hanger rods 29 and 30. Thus, the latter are movable toward or from each other by manipulation of the crank 37 to decrease or increase the distance between the deflector bars 25 and 27 at the discharge end of the apparatus, these bars thus deflecting toward the center line of the conveyor any articles pushed from the working surface 14 of the table onto the conveyor.

At its discharge end, the table has the lower cross-piece 42 extending between its legs to which one of the braces 22a may be secured at its lower end, and the further reinforcing crosspieces 43 and 44 which may also be the usual angle irons. Adjacent its other end the table may have similar reinforcing cross members, and extending between and secured to the lower longitudinal runners 45 of the table may be located a channel beam 46 upon which is shown supported an electric motor 47 connected as by a flexible coupling 47a with a speed reduction device 48 carried by another similar channel beam 49. The output shaft 50 of the speed reduction device 48 may have its outer end passing through a bearing 51 provided by the channel beam 49 and extending therebeyond to have keyed thereto a sprocket wheel 52 upon which is entrained a drive chain 53 also entrained with another sprocket wheel 54 keyed to a shaft 55 journaled in bearings 56 carried by the upright struts 57 on the table to extend cross-wise of the table. Spaced from the sprocket wheel 54 is a sprocket pinion 58 also fastened to the shaft 55 and having entrained therewith a driving chain 59 also entrained with a sprocket wheel 60 fastened to the hub 60a of the roller 17.

As will be best seen from Figs. 1 and 5, the shaft 18 may be stationary in brackets 61 and 62 secured to the upper ends of the legs 11 at this end of the table 10 and projecting outwardly therefrom so that the shaft overhangs somewhat, and the shaft 18 may thus provide an axle not only for the roller 17 but also for the roller 63 for the conveyor belt 64 of the slicer attachment which will next be described. It is to be understood that both the roller 17 and the roller 63 may be independently rotatable on the axle 18, but held from substantial axial movement by frictional abutments of their hubs with each other and with the bearing brackets 61 and 62.

The slicer attachment includes a frame 65 serving as a feed platform, also conveniently of angle iron construction, and extending in cantilever fashion from the adjacent end of the table 10. For this purpose the table may have a pair of short diagonally upwardly and outwardly extending arms 66 and 67 at each side at this end, rigidly secured to the table and forming a hinge bearing as at 68 for another pair of similar arms 69 and 70 to which are secured the angle side members 71 and 72 respectively of the frame 65. From these side members extend diagonal braces 73 and 74 strengthened as by struts 75. The braces 73 and 74 are intended, when the frame 65 is in operative position as shown in full lines in the drawings, to abut the cross angle member 76 of the table and assist in supporting the frame 65 in cantilever arrangement as shown. To prevent slippage of the braces 73 and 74, their ends may be notched as at 77 to engage the cross member 76.

The conveyor belt 64 of the slicer device frame 65 passes not only around the roller 63 but also around another roller 78 which is journaled in bearing brackets 79 suitably secured to the outer end of the frame. The upper run 80 of the conveyor belt 64 desirably passes over a platform 81 forming a top for the frame 65, and its lower run 82 has considerable slack therein which is normally tensioned by a roller 83 carried by a pair of swinging legs 84 pivoted to the frame 65 as at 85 and underneath the frame, so that when the frame is in normal position as shown in full lines for use of the device, gravity acting on the legs 84 and roller 83 will press this roller against the lower run 82 of the belt 64 and tension the latter. The roller 83 may advantageously have flanged ends 83a so as to prevent the belt from running off of the roller.

Not only is the conveyor belt 64 tensioned as just described, with its attendant advantages, but this arrangement provides space on the under side of the frame 65 and in the vertical plane of the belt 64 for a motor 86 suitably secured to the frame advantageously adjacent the brace 73. It will be best seen from Fig. 2 of the drawings, that the frame 65 is widest where it joins the table 10 and narrower at its outer end where it terminates in the roller 78. For this purpose the side member 72 of the frame may be straight while the other side member 71 is angled from where it is secured to the arm 69 toward the other side member 72, so that the main part of the frame 65 is offset laterally of the conveyor 15 of the table 10, while at the same time the conveyor belt 64 discharges to the working surface 14 of the table. The armature shaft 86a of the motor 86 is desirably arranged vertically and immediately to one side of the conveyor belt 64, to pass through an opening 81a in the platform 81. To its upper end is keyed a circular knife blade 87 of a diameter sufficiently large to completely overhang the upper run 80 of the belt 64 and spaced vertically a short distance thereabove, for example, a distance equal to, say, one-half of the height of the ordinary bakery bun.

When buns are placed on the outer end of the conveyor 64, they move in the direction of the arrow 88 on the upper run 80 of the conveyor toward the knife blade, and as they approach the blade, are received between guide bars 89, the ends of which, where the buns enter between them, are flared as at 90. The guide bars 89 may be bolted as at 91 to the frame top and the main portions of these guide bars are arranged apart a distance equal to the diameter of the bun or the like to be sliced, the guide bars being slotted as at 92 and 93 respectively to permit the rotary knife blade 87 to project therethrough to engage the bun, one of which buns is indicated diagrammatically at 94, Fig. 2. Or, if desired, the shaft 86a carrying the rotary blade 87 may be set back slightly so as not to cut the buns quite through, as shown in dotted lines at 87a, Fig. 2.

Figure 4:
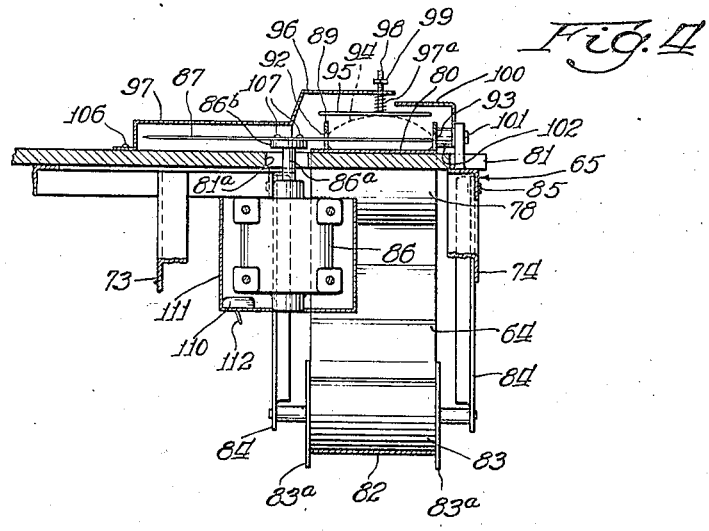
Figure 4 is a vertical section, also on a somewhat larger scale, taken on the line 4—4 of Fig. 1 with other parts in position.

To further insure that the bun will be properly positioned as it moves along the upper belt run 80, a pressure plate 95 (Fig. 4) is desirably suspended from an upwardly offset portion 96 of the cover plate 97 for the knife blade 87, the pressure plate 95 being spring-pressed downwardly as by coil springs 97a surrounding the stems 98 of the pressure plate. These stems may pass freely upwardly through apertures in the cover plate portion 96, nuts 99 secured onto threaded upper portions of the stems 98 limiting downward movement of the pressure plate when a bun is absent from thereunder. This downward movement is also limited by the guide bars 89 upon which the pressure plate may rest when no buns are present. Another angular plate 100 serving as a guard may be advantageously secured along the opposite side of the knife as by the same bolts 101 which secure the guide bar 89, spacer sleeves 102 spacing the guide bar from the guard plate 100.

The conveyor belt 64 is desirably driven by the same motor 47 which drives the conveyor belt 15, and for this purpose the output shaft 50 of the speed reduction device 48 of the motor 47 has keyed thereto a sprocket wheel 103 with which is entrained a drive chain 104 also entrained with a sprocket wheel 105 on the hub of the roller 63. The belt 64 may be driven at a different speed from the speed of the belt 15, and in this instance at a substantially greater speed, since the sprocket 103 is a trifle larger than the sprocket 105, while the sprocket 52 in the train of the roller 17 is substantially smaller than the sprocket 54, and the sprocket 58 is again smaller than the sprocket 60 for roller 17.

So constructed and arranged, a procession of buns may be placed by an operator on the outer end of the upper belt run 89, as the buns come warm and soft from the oven. The buns move rapidly along the frame 65 in the direction of arrow 88 into engagement with the slicer blade 87, where they are neatly and cleanly cut in half, horizontally, and from which they are delivered to the working surface 14 of the table still in single file procession. The underside of the table top 14 adjacent the roller 63 is advantageously beveled as at 14a to suit a close position thereof with respect to the roller 63, so as to facilitate movement of the buns onto the table top. There groups of the buns may be placed, by another operator standing adjacent this working table surface, into containers such as shallow cardboard trays shown suggestively at 113, and for example, narrow side up, with, say, several buns in each tray. Each tray as it is loaded may be pushed by this operator from the working surface 14 onto the conveyor belt 15, where the buns, being now in groups in trays instead of in a single file procession, may be conveyed at a somewhat slower rate, in the direction of arrow 24, to the delivery end of the apparatus illustrated by the plate 23, from where they move into a wrapping machine (not shown) which may be of conventional type and which wraps the cardboard trays with a group of buns, in each tray, with a transparent wrapper through which the buns may be seen while being kept warm, fresh and soft and substantially as they came from the oven a short interval before.

When the apparatus is not in use, the frame 65 may be swung upwardly on the hinge 68 into folded position as indicated in broken lines in Fig. 1, superimposed on the table 10, and minimizing the space occupied by the apparatus. In this position, the arch member 33 is arranged to accommodate the free end of the frame, that is, the end of the frame which carries the roller 78. Also in this reversed position, the gravity roller 83 drops toward the frame, thus releasing the slack in the conveyor belt 64 and permitting the folding of the frame without shifting of the axis of the roller 63, which, it will be remembered, while serving the frame 65, is shown actually carried by the table 10. The slack thus provided in the belt 64 permits this belt to be continued to be entrained about the rollers 63 and 78 in the folded position of the frame as described, the belt folding upon itself correspondingly. The entire apparatus being thus supported upon the casters 12 is portable, being readily moved if desired to a convenient location away from the wrapping machine so that the wrapping machine may be used for other purposes, until the bun handling apparatus is again desired to be used when it can be quickly restored to the position shown in full lines in Fig. 1.

When it is desired to use the apparatus with unsliced buns, the knife cover-plate 97 may be conveniently removed by detaching the screws 106 of the cover plate and the screws 107 which key the knife blade to the enlarged top 86b of the motor armature shaft 86a, the blade being then slid from out of the slots 92 and 93. The buns may then move through the device as before, but without engaging a slicer.

Suitable electric wiring connections may be made from the customary supply circuit to the motors 47 and 86, and through a switch 108 having an operating lever 109. It is not necessary to show the wiring since this forms no part of the present invention and may be conventional. It may be remarked, however, that movement of the switch lever 109 may thus control the operation of both the belts 64 and 15, while the motor 86 for the knife blade may preferably have its own switch 110 carried for example, within a motor casing 111 for the motor 86 and through which a switch lever 112 may project, accessible to the operator.

It is to be understood that the invention is not intended to be limited to details of construction here shown for illustrative purposes. Other modifications will suggest themselves to those skilled in the art and having the benefit of the present disclosure. Furthermore, it is not intended that it be understood that all features of the present disclosure must be used conjointly, since it will be apparent to workers in the art that various combinaitons or sub-combinations may at times be advantageously employed.

Having described my invention, I claim:

1. In apparatus for handling baked buns or the like, the combination with a table having a working surface, of a conveyor carried by the table along one side thereof, a pair of upwardly and outwardly extending arms carried by the table at one end thereof, a second conveyor, a frame for said second conveyor normally projecting from one end of said table, a pair of upwardly and outwardly extending arms carried by said frame at its end adjacent said table and pivoted to the said arms on the table respectively whereby the frame is foldable onto the table to conserve space when not in use, the discharge end of the said second conveyor when the latter is unfolded to project from the table terminating adjacent the working surface of the table spaced laterally from the first mentioned conveyor, and means carried by the table for driving both conveyors and arranged to be in operative position upon unfolding of said frame.

2. In apparatus for handling baked buns or the like, the combination with a table having a working surface, of a conveyor carried by the table along one side thereof, a second conveyor, a frame for said second conveyor normally projecting in cantilever arrangement from one end of said table and pivoted thereto on a horizontal axis whereby the frame is foldable onto the table to conserve space when not in use, the discharge end of the said second conveyor when the latter is unfolded to project from the table terminating adjacent the working surface of the table spaced laterally from the first mentioned conveyor, and common means carried by the table for driving both conveyors and arranged to be in operative position upon unfolding of said frame.

3. In apparatus for handling baked buns or the like, the combination with a table, of an endless belt conveyor along one side thereof, a second endless belt conveyor, a pair of axially aligned rollers carried by the table for said conveyors respectively, said rollers being carried by the table through the intermediation of a common axle therefor, a frame for said second endless belt conveyor projecting from one end of said table and offset laterally from the first mentioned conveyor, a rotary knife carried by the frame in the path of said second endless belt conveyor, guide plates for directing the buns to the knife, there being a motor for rotating said knife depending within the frame below the upper run of said endless belt conveyor, a swinging member pivoted on the under side of said frame having a free end hanging downwardly therefrom, an idler roller carried by said swinging member below said motor to rest on the under run of the conveyor under the influence of gravity and urge the run downwardly to take up slack in the said belt conveyor and to prevent interference therewith by said motor.

4. In apparatus for handling baked buns or the like, the combination with a table, of a conveyor along one side thereof, an endless belt conveyor, a frame for said endless belt conveyor projecting from one end of said table and offset laterally from the first mentioned conveyor, a rotary knife carried by the frame in the path of said endless belt conveyor, guide plates for directing the buns to the knife, there being a motor for rotating said knife depending within the frame below the upper run of said endless belt conveyor, an arm pivoted on the under side of said frame having a free end hanging downwardly therefrom, an idler roller carried by said arm below said motor to rest on the under run of the conveyor under the influence of gravity and urge the run downwardly to prevent interference by said motor, and common means carried by the table for driving both conveyors.

5. In apparatus for handling baked buns or the like, the combination with a table having a working surface, of a conveyor along one side thereof, an endless belt conveyor aligned with the working surface on said table parallel with said first mentioned conveyor, a frame for said endless belt conveyor projecting from one end of said table, said frame being pivoted to said table at said end on a horizontal axis to permit folding of the frame over onto the table when not in use, a rotary knife carried by the frame in the path of said endless belt conveyor, guide plates for directing the buns to the knife, a motor for rotating said knife depending within the frame below the upper run of said endless belt conveyor, an idler roller carried by the frame to be under the influence of gravity below said motor to deflect the under run of the endless belt conveyor downwardly to take up slack in said belt conveyor and to prevent interference therewith by said motor, said idler roller moving toward the table under the influence of gravity when the frame is folded thereunto to provide slack in the belt conveyor.

6. In apparatus for handling baked buns or the like, the combination with a table, of a conveyor along one side thereof, an endless belt conveyor, a frame for said endless belt conveyor projecting from one end of said table and offset laterally from the first mentioned conveyor, a rotary knife carried by the frame in the path of said endless belt conveyor, guide plates for directing the buns to the knife, a motor for rotating said knife depending within the frame below the upper run of said endless belt conveyor, an idler roller carried by the frame under the influence of gravity below said motor to deflect the under run of the endless belt conveyor downwardly to take up slack therein and to prevent interference therewith by said motor, and common means carried by the table for driving both conveyors.

7. In apparatus of the class described, the combination with a table, of a conveyor movable thereon, a pair of guide bars overlying the conveyor at each side thereof and pivoted to be moved toward and from each other, a pair of hanger rods, the free ends of said guide bars being rotatively carried by the pair of hanger rods, a rotatable shaft threadedly engaging the hanger rods respectively at each end of the shaft, the hanger rods being otherwise unattached, right and left-hand screw threads on the shaft at said ends respectively whereby rotation of the shaft will move the hanger rods toward or from each other and carry the free ends of the guide bars therewith and whereby the hanger rods may swing on the shaft to adapt themselves to the positions of the guide bars, an arch bar mounted on the table and rotatably carrying said shaft, a conveyor frame pivoted to the opposite end of the table and foldable onto the table with its free end adjacent said arch bar, and means for rotating the shaft.

8. In apparatus of the class described, the combination with a conveyor, of a pair of guide bars overlying the conveyor at each side thereof and pivoted to be moved toward and from each other, a pair of hanger rods, the free ends of said guide bars being rotatively carried by the pair of hanger rods, a rotatable shaft threadedly engaging the hanger rods respectively at each end of the shaft, the hanger rods being otherwise unattached, right and left-hand screw threads on the shaft at said ends respectively whereby rotation of the shaft will move the hanger rods toward or from each other and carry the free ends of the guide bars therewith and whereby the hanger rods may swing on the shaft to adapt themselves to the positions of the guide bars, and means for rotating the shaft.

JOHN TOD.